US 6,189,315 B1

United States Patent
Dennis, Jr. et al.

(10) Patent No.: US 6,189,315 B1
(45) Date of Patent: Feb. 20, 2001

(54) LOW-COST GAS GENERATOR AND IGNITOR

(75) Inventors: Henry J. Dennis, Jr.; D. Andy Hissam, both of Madison; W. Neill Myers; Eric S. Taylor, both of Huntsville, all of AL (US)

(73) Assignee: The United States of America as represented by the Administrator of the National Aeronautics and Space Administration, Washington, DC (US)

( * ) Notice: Under 35 U.S.C. 154(b), the term of this patent shall be extended for 0 days.

(21) Appl. No.: 09/350,412

(22) Filed: Jun. 18, 1999

(51) Int. Cl.$^7$ ........................................ F02K 9/42
(52) U.S. Cl. .................. 60/259; 60/39.821; 239/424
(58) Field of Search .................. 60/258, 259, 39.821, 60/39.823; 239/424, 424.5, 425, 428, 430, 432, 433

(56) References Cited

U.S. PATENT DOCUMENTS

| | | | |
|---|---|---|---|
| 3,048,966 | * 8/1962 | Feraud et al. | 60/259 |
| 3,603,092 | * 9/1971 | Paine | 60/258 |
| 4,882,904 | * 11/1989 | Schoenman | 60/258 |
| 5,404,715 | * 4/1995 | Vuillamy et al. | 60/257 |

* cited by examiner

*Primary Examiner*—Charles G. Freay
(74) *Attorney, Agent, or Firm*—James J. McGroary

(57) ABSTRACT

A gas generator and ignitor assembly for powering a turbine of a turbopump assembly for a rocket engine comprises an injector and a combustion chamber, the injector having a body member including a fuel inlet and an oxidizer inlet spaced one from the other and communicating with respective radially spaced apart annular members in the body member. Three annuli communicate with the fuel inlet and two annuli communicate with the oxidizer inlet, the annuli which communicates with the oxidizer being positioned between pairs of the other annuli. The body member is enclosed by a plate having an array of bores arranged in two series with three radially spaced apart groups of circular rows in each series. The outer series has 28 groups of triplet bores while the inner series has 14 groups of triplet bores. The annuli which communicate with oxidizer feed bores of each series that are between the other bores of a triplet, the latter bores communicating with annuli that communicate with fuel. The inner and outer bores of the triplets of each series are inclined relatively to each other and to the third bore of the triplet so that fuel and oxidizer atomizes as it is sprayed into the inlet of the combustion chamber where the propellants are mixed, and burned. The burning of the propellants is effected by ignition of a plug of solid propellant fuel mounted to communicate with the interior of the combustion chamber.

14 Claims, 2 Drawing Sheets

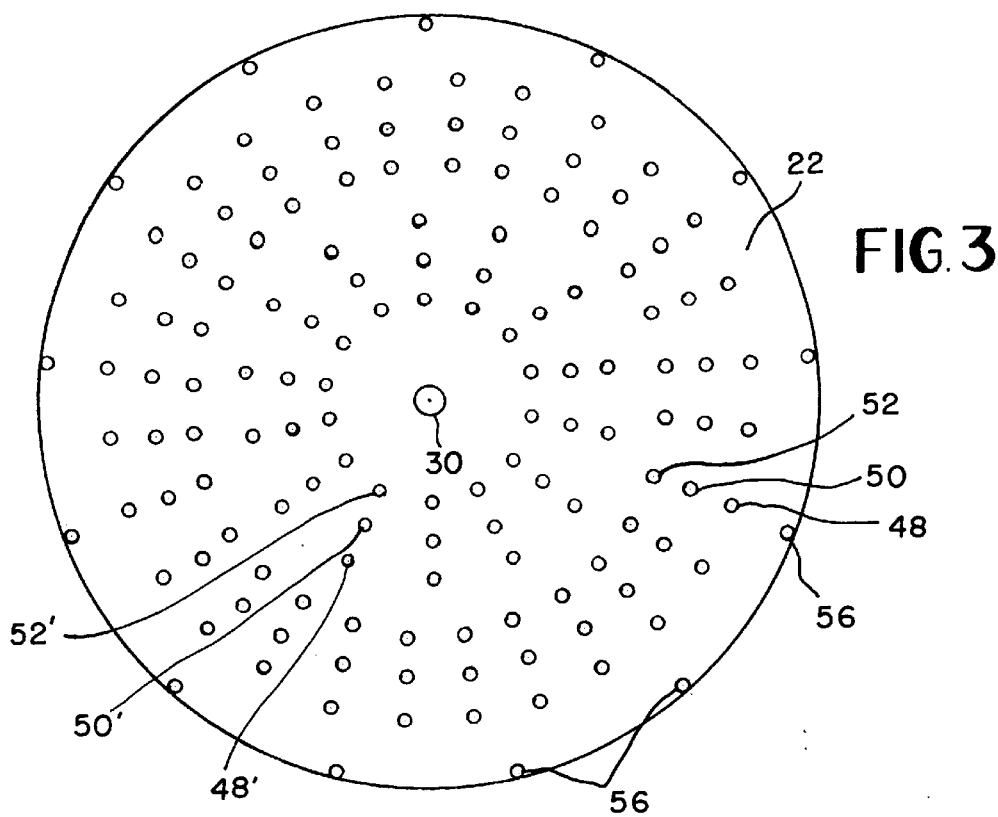
FIG. 3
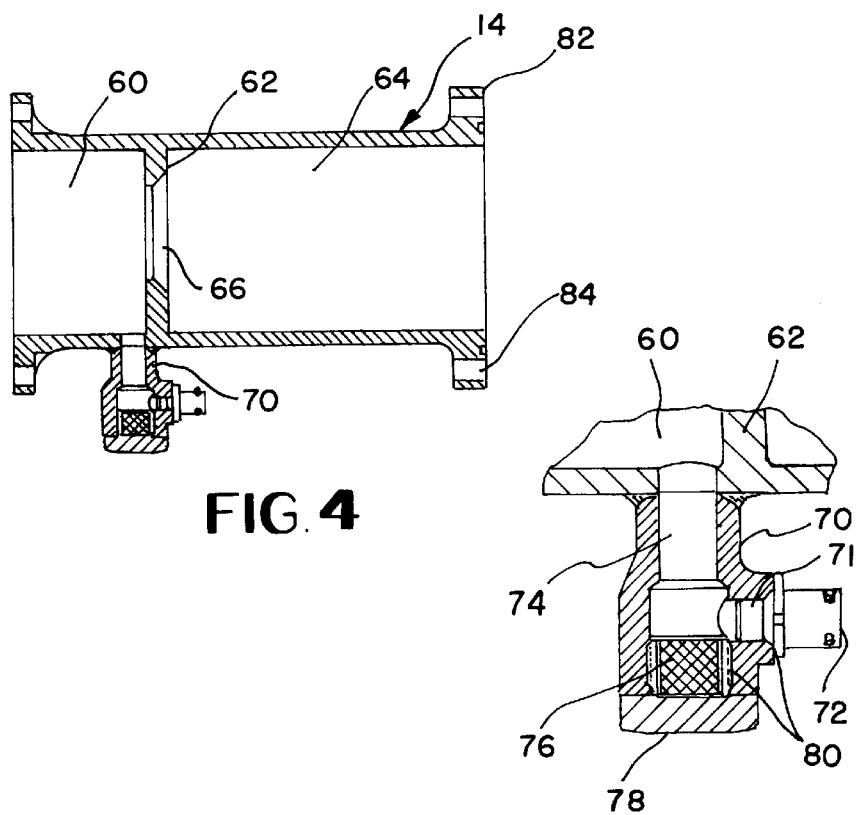
FIG. 4
FIG. 5
FIG. 6

LOW-COST GAS GENERATOR AND IGNITOR

ORIGIN OF THE INVENTION

This invention was made by employees of the United States Government and may be manufactured and used by or for the Government for governmental purposes without the payment of any royalties.

BACKGROUND OF THE INVENTION

1. Field of the Invention

This invention relates to a gas generator and ignitor for providing a high pressure hot gas source to power a turbopump assembly of a rocket engine.

2. Prior Art

Gas generator/ignitor assemblies are used to provide hot gases to rotatably drive the turbopumps of a rocket engine. The known assemblies are very complex and require many parts. A preburner, which is a device similar to a gas generator, generates the hot gasses necessary to drive the turbopumps in, for example, the main engine of the space shuttle or Space Shuttle Main Engine (SSME). The SSME has two such preburners which operate at very high pressures and temperatures. One of the preburners is for the fuel and the other for the liquid oxygen oxidizer (LOX). A gas generator and ignitor assembly may comprise an injector and a combustion chamber. In the SSME the fuel preburner consists of 264 injector elements while the LOX preburner consists of 120 injector elements. Obviously, the complexity of the injectors and the manufacture of the many parts comprising the injectors results in substantial machining of the parts, and other manufacturing and inspection steps resulting in substantial costs. Moreover, many of the existing designs incorporate internal valves to control the flow of propellants to the gas generator thereby resulting in substantially increased complexity and costs. If access to space is to be readily available for commercial payloads, costs must be reduced and controlled.

SUMMARY OF THE INVENTION

Consequently, it is a primary object of the present invention to provide a gas generator and ignitor assembly which may generate a high pressure high temperature gas to power a turbopump assembly for a rocket engine, the assembly having a relatively small number of parts requiring a minimum amount of machining and assembly steps, thereby resulting in a low cost reliable assembly.

It is another object of the present invention to provide a low cost gas generator/ignitor assembly for driving the turbopump assembly of a liquid propellent rocket engine which comprises an injector having a minimum number of parts and a combustion chamber connected to and communicating with the output of the injector.

It is a further object of the present invention to provide a low cost gas generator/ignitor assembly for driving the turbopump assembly of a liquid propellent rocket engine which comprises an injector having an array of bores in three radially spaced apart circular rows, the bores in each row being aligned radially with the bores in the other two rows to form a bore triplet, respective bores communicating with fuel and with oxidizer, the fuel exiting the fuel bores of a triplet being arranged to impinge on the oxidizer exiting an oxidizer bore of the triplet so that atomization occurs properly.

Accordingly, the present invention provides a gas generator and ignitor assembly for powering a turbine of a turbopump assembly for a rocket engine, the gas generator and ignitor assembly comprising an injector and a combustion chamber. The injector comprises a body member having a fuel inlet and an oxidizer inlet spaced one from the other and communicating with respective radially spaced apart annular chambers in the body member, the annular chambers in the body member being enclosed by a plate having an array of bores arranged in three radially spaced apart circular rows, each bore in one row being aligned radially with a bore in each of the other rows to form a triplet of bores, the bores communicating with respective chambers within the body member. Two of the bores of each triplet are inclined relatively to each other and to the third bore and communicates with chambers which communicate with the fuel supply while the third bore of each triplet, which is radially intermediate the other two bores, communicates with the chamber that communicates with the oxidizer supply.

The triplet arrangement of the bores permits ready atomization of the propellants and insures proper combustion within the combustion chamber where the propellants are mixed, ignited and burned, the burning or combustion of the propellants resulting from ignition of a plug of solid propellant mounted to communicate with the combustion chamber.

BRIEF DESCRIPTION OF THE DRAWINGS

The particular features and advantages of the invention as well as other objects will become apparent from the following description taken in connection with the accompanying drawings in which:

FIG. 3 is an elevational view of the face plate of the injector of FIG. 2;

FIG. 4 is a cross sectional view taken through the combustion chamber illustrated in FIG. 5;

FIG. 5 is an elevational view of the trip ring used in the combustion chamber as illustrated in FIG. 4; and FIG. 6 is a cross sectional view, greatly enlarged, of the ignitor bores assembly illustrated in FIG. 4.

DESCRIPTION OF THE PREFERRED EMBODIMENT

Figure 2:
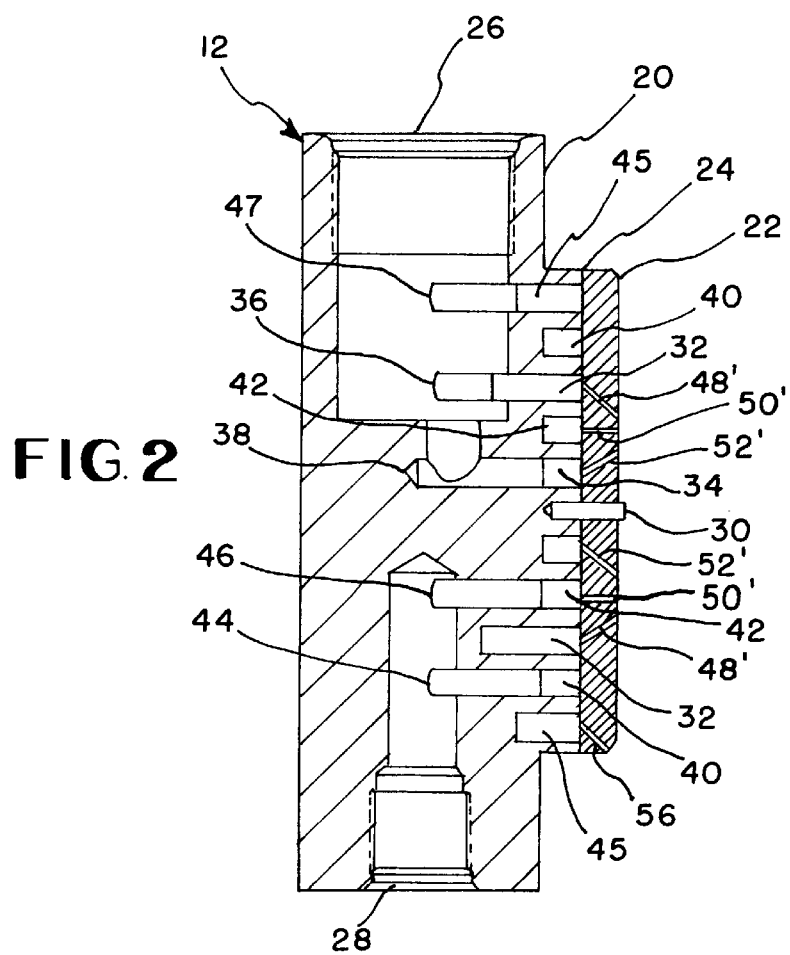
FIG. 2 is an enlarged cross sectional view taken through the injector portion of the assembly of FIG. 1.

Referring now to the drawings, a gas generator/ignitor assembly 10 constructed in accordance with the present invention comprises two main components, an injector 12 and a combustion chamber 14, the injector being connected to the combustion chamber by a plurality of fasteners 16 with a metal seal 18 disposed therebetween within an annulus in the abutting face of the combustion chamber, the seal being spring biased to preclude combustion products from escaping from the combustion chamber past the abutting face of the injector. The injector 12, as best illustrated in FIG. 2, comprises an injector body or core 20 having internal passages as hereinafter described and a monolithic oxygen-free copper face plate 22 attached to the injector body 12 and secured by a high-temperature braze 24. The injector core 12 has a fuel inlet 26 extending radially from the periphery and a liquid oxygen (LOX) oxidizer inlet 28 which extends radially from the outer periphery at approximately 180 degrees relative to the fuel inlet 26. The injector body 12 further includes a plurality of annuli having a respective axis 30 disposed substantially perpendicular to the axis of elongation of each of the inlets 26, 28. In the preferred mode of the invention there are five such annuli. Preferably there are at least two concentric annuli 32, 34 which communicate with and receive fuel from downcomer holes 36, 38 respectively in downcomers or pipes communicating with the annuli 32, 34. Similarly, there is another pair of annuli 40, 42 which communicate through downcomers 44, 46 respectively with the oxidizer inlet 28. There is another annulus 45 which communicates and receives fuel from a downcomer hole 47. The annuli 32, 34, 40, 42, and 45 are arranged, as aforesaid, at various radii about the axis 30. Thus there are five annuli, three for fuel 34, 32 and 45 and two for oxidizer 40, 42. The first and third annuli 45, 32, feed fuel along with the second annulus 40 which feed oxidizer to a series of injection bores in a face plate 22 adjacent to the outer periphery of the face plate. These injection bores comprise bores 48, 50, 52 arranged as triplets with each bore 50 disposed intermediate the bores 48 and 52. This outer series of rows of triplets comprise 28 groups of triplet injection bores. The third and the fifth annuli 32, 34, feed fuel along with the fourth annulus 42 which feeds oxidizer to another series of triplet injection bores 48', 50', 52' disposed within the inner area of the face plate remote from the periphery and spaced radially inwardly from the first or outer series of bores. This inner series of rows of bores comprises 14 groups of triplet injection bores. The first row 45 also feeds fuel toward the combustion chamber wall through film coolant bores 56 disposed about the periphery of the face plate for purposes of cooling the combustion chamber wall and preventing uneven mixing and burning in the chamber from overheating and thereby damaging the combustion chamber, the specific number of film coolant bores 56 and the specific locations thereof being determined by the heat generated during combustion. This construction insures that as the fuel and oxidizer propellants exit the respective bores, proper atomization occurs so that efficient combustion may ensue. Also disposed in the face plate is a plurality of film coolant bores 56 disposed at the periphery of the face plate, these bores communicating with the annulus 45 within the body of the injector.

The combustion chamber, which is illustrated in cross section in FIG. 4, is, of course, where the fuel and oxidizer propellants are mixed and burned. The combustion chamber is an elongated duct into which the outlets of the bores 48, 50, 52 open and thus the propellants are mixed after atomization in the forward compartment 60 of the combustion chamber. Combustion occurs just in front of a trip ring 62 which divides the forward portion 60 of the combustion chamber from the exit portion 64. The trip ring as illustrated in FIG. 5 is merely an annular wall having a central opening 66. The trip ring 62 aids in improving mixing of the propellants and provides a more uniform temperature distribution as the gases exit the combustion chamber. As illustrated, the trip ring has a slot 68 extending in the wall thereof so as to prevent pooling of the propellants between firings or tests. When installed on an engine, the combustion chamber is oriented with the slot 68 at the bottom thereof so that the propellants may readily flow by gravity.

Figure 1:
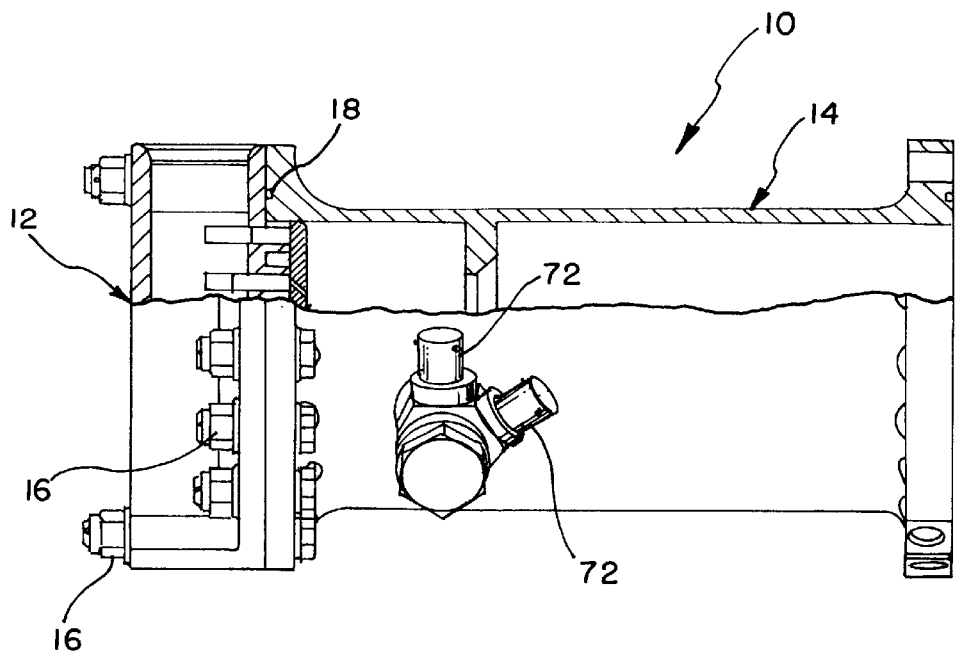
FIG. 1 is a side elevational view with portions thereof in cross section of an injector and combustion chamber forming a gas generator and ignitor assembly constructed in accordance with the present invention.

Secured to the combustion chamber at the exterior thereof just upstream of the trip ring 62 is an ignitor boss 70 which extends radially outwardly from the combustion chamber and includes first and second bores 71 (only one of which is illustrated) within which are threaded or otherwise secured a pair of NASA Standard Initiators (NSI) 72 illustrated in FIGS. 1 and 6. These initiators when receiving a current, cause ignition. Mounted in a bore communicating with the bores 71 in which the initiators are mounted and extending into a channel 74 communicating with the interior of the combustion chamber upstream of the trip ring is a small cavity within which a plug of solid propellant 76 may be mounted. The plug of propellant may be bonded by epoxy or the like in a standard bleeder plug 78 which is an inexpensive off-the-shelf item. A metal C-ring 80 seals each of the initiators and the propellant plug. Once ignited, the plug of solid propellant provides approximately five seconds of burn which is sufficient to initiate combustion in the combustion chamber 14. The exit flange 82 of the combustion chamber includes a plurality of holes 84 for attachment to a turbopump assembly (not illustrated).

Accordingly, it may be seen that the present invention limits the number of parts and thus the amount of machining that must be performed to manufacture the assembly of the present invention, and the number of joints which must be sealed or welded are also minimized. Accordingly, the time of assembly and the cost is substantially reduced from that of the prior art. Consequently, a low cost gas generator and ignitor assembly which is highly reliable has been disclosed, the assembly being capable of reuse merely by substitution of another plug of solid propellant fuel 76 within bleeder plug 78, and NSI's 72. Additionally, cost is minimized by the use of a substantial number of inexpensive off-the-shelf items Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention what is claimed herein is:

1. A gas generator and ignitor assembly for generating a pressurized hot gas for driving a turbopump of a rocket engine, said assembly comprising: an injector and a combustion chamber, said injector having a body member including a fuel inlet port opening into a fuel passageway and an oxidizer inlet port opening into an oxidizer passageway, five substantially concentric annular grooves formed within said body member opening outwardly to the exterior of the body member and disposed about an axis extending through said body member, the annular groove closest to said axis, the annular groove furthest from said axis and one of the annular grooves between these grooves communicating with said fuel passageway for receiving fuel therefrom, the remainder of said five annular grooves communicating with said oxidizer passageway for receiving oxidizer therefrom, a plate secured to said body member substantially normal to said axis for closing said five grooves from the exterior of said body member, an array of bores arranged in sets of three radially spaced apart circular rows about said axis formed in said plate, each bore in one row being aligned with a bore in each of the other two rows of each set to form a triplet of bores, a first of the bores of each triplet being in the row furthest from said axis and a second of the bores being in the row closest to said axis communicating with a fuel receiving an annular groove, and the third of the bores being in the other row communicating with an oxidizer receiving annular groove, said combustion chamber comprising a conduit having a mixing and ignition section and an exhaust section secured to said injector with said mixing and ignition section communicating with and receiving fuel and oxidizer from said bores.

2. A gas generator and ignitor assembly as recited in claim 1, wherein said first and said second of said bores of each triplet are inclined relatively to each other and to the third of said bores of the triplet, whereby fuel flowing through said first and second of said bores impinges upon oxidizer flowing through said third of said bores.

3. A gas generator and ignitor assembly as recited in claim 1, wherein said fuel passageway and said oxidizer passageway are disposed along axes lying in planes inclined relatively to said axis.

4. A gas generator and ignitor assembly as recited in claim 1, wherein said combustion chamber includes an annular wall defining a trip ring dividing said mixing and ignition section from said exhaust section, and an ignitor assembly fastened to said combustion chamber, said ignitor assembly including a channel communicating with said mixing and ignition section adjacent said trip ring, a plug for carrying solid fuel propellent mounted within said channel, and at least one ignitor disposed within said channel for igniting said solid propellent.

5. A gas generator and ignitor assembly as recited in claim 2, wherein said fuel passageway and said oxidizer passageway are disposed along axes lying in planes inclined relatively to said axis.

6. A gas generator and ignitor assembly as recited in claim 4, wherein said fuel passageway and said oxidizer passageway are disposed along axes lying in planes inclined relatively to said axis, and wherein said first and second bores of each triplet are inclined relatively to each other and to the third bore.

7. A gas generator and ignitor assembly as recited in claim 2, wherein said combustion chamber includes an annular wall defining a trip ring dividing said mixing and ignition section from said exhaust section, and an ignitor assembly fastened to said combustion chamber, said ignitor assembly including a channel communicating with said mixing and ignition section adjacent said trip ring, a plug for carrying solid fuel propellent mounted within said channel, and at least one ignitor disposed within said channel for igniting said solid propellent.

8. A gas generator and ignitor assembly as recited in claim 1, wherein said plate is copper and is brazed to said body member.

9. A gas generator and ignitor assembly as recited in claim 8, wherein said first and said second of said bores of each triplet being inclined relatively to each other and to the third of said bores of the triplet, whereby fuel flowing through said first and second of said bores impinges upon oxidizer flowing through said third of said bores.

10. A gas generator and ignitor assembly as recited in claim 9, wherein said fuel passageway and said oxidizer passageway are disposed along axes lying in planes inclined relatively to said axis.

11. A gas generator and ignitor assembly for driving a turbine of a turbopump assembly of a liquid propellant rocket engine, said assembly comprising an injector and a combustion chamber, said injector including a fuel inlet and an oxidizer inlet spaced from the fuel inlet, a plurality of radially spaced apart annular chambers in said body member, at least two of said chambers communicating with said fuel inlet and the others of said chambers communicating with said oxidizer inlet, a plate having an array of bores arranged in groups of three radially spaced apart circular rows secured to and enclosing said annular chambers of said body member, one bore of each row of a respective group being aligned radially with a bore in each of the other rows to form a triplet of bores, two of the bores of each triplet communicating with a respective fuel inlet communicating chambers and the other of said bores communicating with said other of said chambers, and means for connecting said injector to said combustion chamber with said bores disposed for injecting fuel and oxidizer into said combustion chamber.

12. A gas generator and ignitor assembly as recited in claim 11, wherein said two of said bores of each triplet of bores are inclined relatively to each other and to said other of said bores.

13. A gas generator and ignitor assembly as recited in claim 12, wherein said combustion chamber comprises a conduit having an ignition and mixing section and exhaust section, an annular wall defining a trip ring dividing said ignition and mixing section from said exhaust section, and ignition means for igniting fuel and oxidizer injected into said ignition and mixing section.

14. A gas generator and ignitor assembly as recited in claim 13, wherein said ignition means comprises an assembly including a channel communicating with said mixing and ignition section adjacent said trip ring, a plug for carrying solid fuel propellent mounted within said channel adjacent to said trip ring, and at least one ignitor disposed within said channel for igniting said solid propellent.

* * * * *